United States Patent [19]

Yamamoto

[11] Patent Number: 5,089,891
[45] Date of Patent: Feb. 18, 1992

[54] CIRCUIT INCLUDING CLIPPING AND NON-LINEAR PROCESSING MEANS FOR CORRECTING THE TONE OF AN IMAGE SIGNAL

[75] Inventor: Kazumi Yamamoto, Yokohama, Japan

[73] Assignee: Ikegami Tsushinki Co., Ltd., Ohta, Japan

[21] Appl. No.: 626,211

[22] Filed: Dec. 12, 1990

[30] Foreign Application Priority Data

Dec. 26, 1989 [JP] Japan .................. 1-335036

[51] Int. Cl.⁵ .................. H04N 5/702; H04N 5/52
[52] U.S. Cl. .................. 358/164; 358/166; 358/174; 358/172
[58] Field of Search .............. 358/166, 168, 169, 170, 358/171, 164, 174, 39

[56] References Cited

U.S. PATENT DOCUMENTS

| | | | |
|---|---|---|---|
| 4,038,688 | 7/1977 | Chow et al. | 358/174 |
| 4,057,828 | 11/1977 | Monahan | 358/169 |
| 4,589,022 | 5/1986 | Prince et al. | 358/166 |
| 4,843,472 | 6/1989 | Shinada | 358/168 |
| 5,021,886 | 6/1991 | Shibuyama | 358/170 |

FOREIGN PATENT DOCUMENTS 0119383 5/1990 Japan .

Primary Examiner—James J. Groody
Assistant Examiner—Jeffrey S. Murrell
Attorney, Agent, or Firm—Spencer & Frank

[57] ABSTRACT

A circuit for correcting a tone of a brightness signal generated by a television camera including an upper limiter for clipping off an upper portion of the brightness signal higher than an upper threshold level, and a lower limiter for clipping off a lower portion of the brightness signal lower than a lower threshold level which is automatically changed in accordance with a peak value of the black level of the brightness signal. A middle level brightness signal produced by the lower limiter is processeed by a non-linear circuit and then a difference between a non-linearly processed bright signal and the middle level brightness signal is derived to produce a tone correction signal. After the polarity and gain of the tone correction signal are manually adjusted, the tone correcting signal is added to the input brightness signal. In this manner the tone of a television image displayed on a television monitor screen can be corrected exclusively in a dark area without affecting the tone in a bright area. When the tone correction signal has the negative polarity, the dark background can be further darkened without decreasing the brightness in the bright area to attain a special production effect.

10 Claims, 5 Drawing Sheets

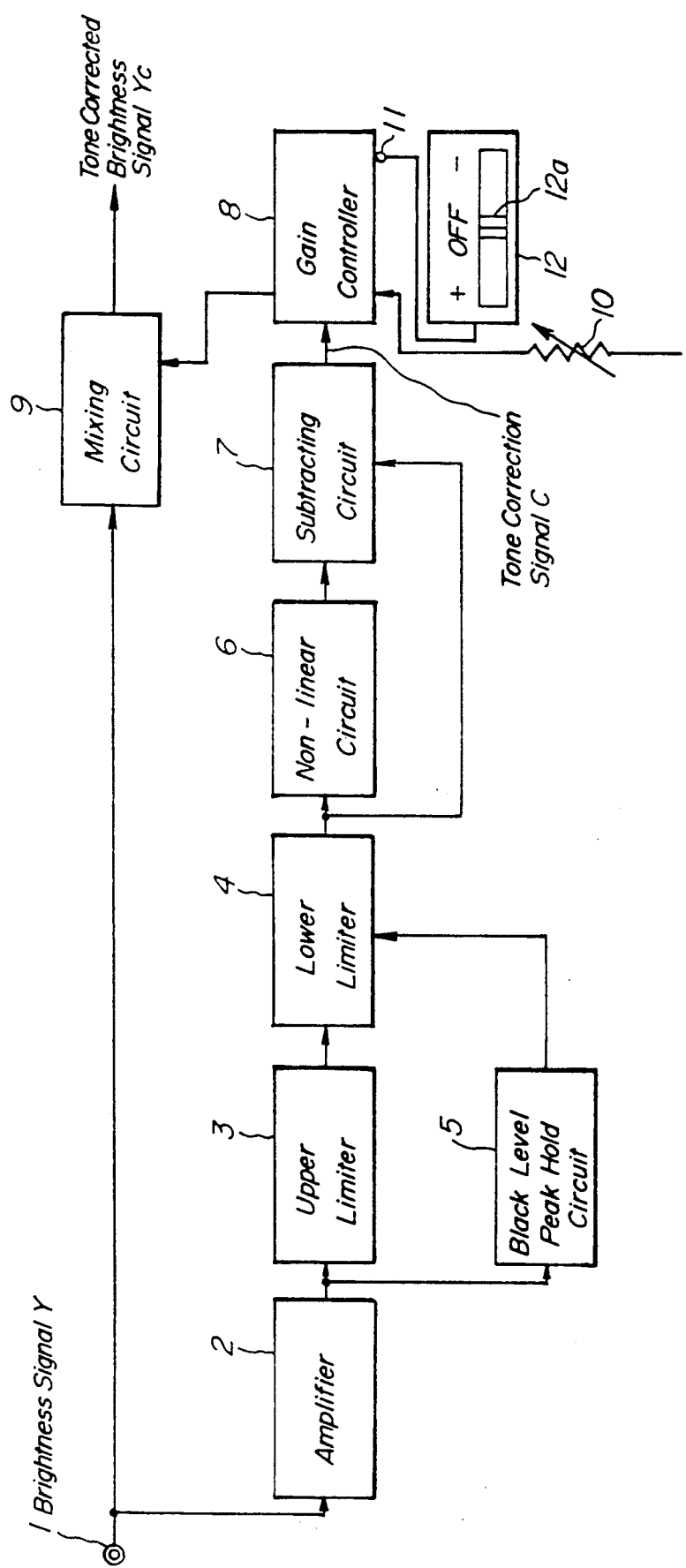

FIG_2
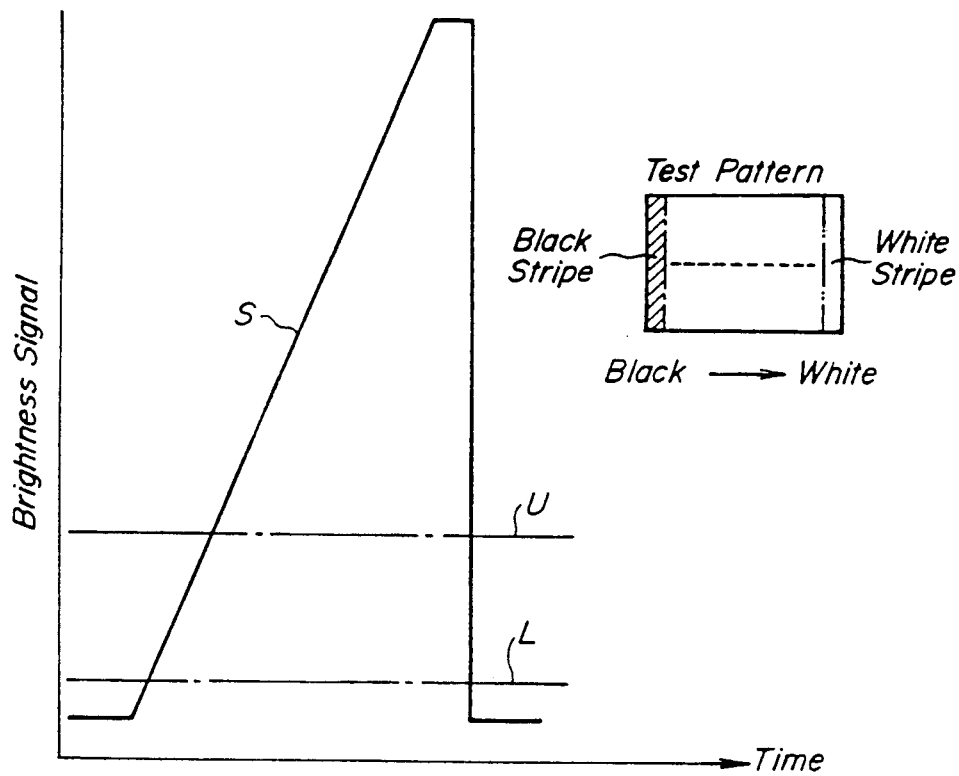
FIG_3
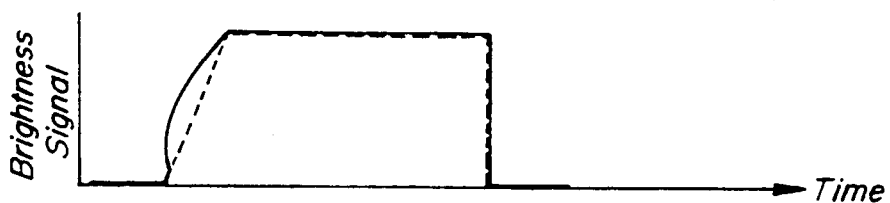
FIG_4
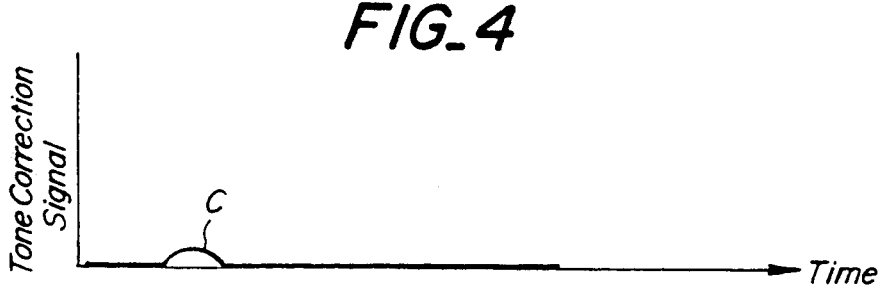

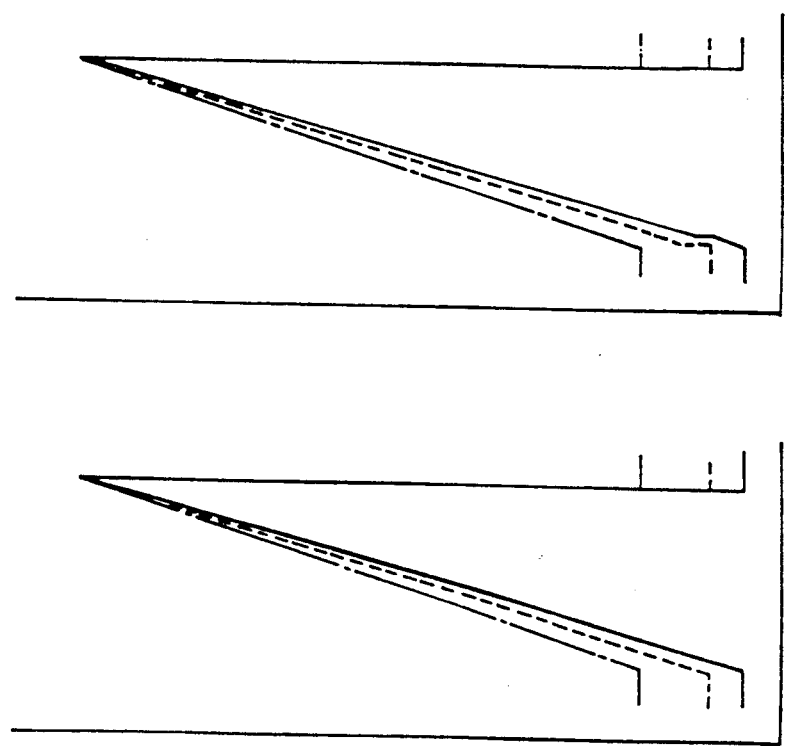
FIG.5D PRIOR ART — Known Tone Correction
FIG.5C — Tone Correction with Negative Polarity
FIG.5B — Tone Correction with Positive Polarity
FIG.5A — Input Brightness Signal

CIRCUIT INCLUDING CLIPPING AND NON-LINEAR PROCESSING MEANS FOR CORRECTING THE TONE OF AN IMAGE SIGNAL

BACKGROUND OF THE INVENTION

Field of the Invention and Related Art Statement

The present invention relates to a circuit for correcting the tone of an image signal, and more particularly to a circuit for correcting automatically the tone of a brightness signal of a television signal generated by a television camera.

When picking-up scenes with the aid of the television camera, the image signal is supplied to a television monitor to display images on a monitor screen. Nowadays the brightness conversion characteristic of the television monitor has changed. That is to say, almost all television previously monitors had gamma values of about 2.2, but recently the gamma value has been increased to about 2.8. When the image signal is supplied to such a television monitor having the higher gamma value, an image displayed on the display screen of the monitor is deteriorated such that the tonal property of a relatively dark portion of the displayed image becomes worse. In order to avoid such a deterioration of the tone of the displayed image, there has been proposed a technique for compensating for the deterioration of the tone by correcting the tone of the image signal such that the gain of the brightness signal is selectively increased only at dark areas. Such a tone correcting circuit has been disclosed in Japanese Patent Application Laid-open Publication Kokai Sho 60-214,692. In the known tone correcting circuit described in this publication, the brightness signal generated by the television camera is supplied to a non-linear circuit, i.e. a so-called knee circuit and the gain of the brightness signal in the dark area is enhanced to derive an enhanced brightness signal, a tone correction signal is produced by deriving the difference between the original brightness signal and the enhanced brightness signal, and the tone correction signal thus derived is added to the original brightness signal.

In the above explained known tone correction circuit, the whole brightness signal is processed by the non-linear signal. so that the gain of the brightness signal in the bright area is decreased by the non-linear circuit and the contrast of the brightness signal in the bright area is also decreased. Further, when the correction amount of the brightness signal in the dark area is increased, the black level is also increased and thus the contrast of the displayed image is correspondingly decreased. Therefore, when a scene which does not include a dark area is picked-up by the television camera, the whole displayed image becomes white and the image quality is deteriorated to a large extent.

In order to remove the above mentioned drawbacks of the known tone correcting circuit, consideration has been given to manually adjusting a gain control amplifier for amplifying the tone correction signal. Then the operator watches carefully the displayed image to determine whether tone correction is required or not, and when the quality of the image displayed on the monitor screen has been made worse by the tone correction, the gain of the correction signal amplifier is adjusted to zero. Such a manual adjustment is apparently very cumbersome for the operator. Moreover when the operator is in such a situation that he cannot use a television monitor, it is not possible to adjust the gain of the amplifier. When the operator controls the gain of the tone correction signal amplifier without monitoring the displayed image, the quality of the image might deterioration still further.

Furthermore, in the known tone correcting circuit, the tone correction signal always has a positive polarity and is added to the original brightness signal to increase the level of the image signal in the dark area. However, it has been confirmed that in some case it is desired to decrease the level of the brightness signal in the dark area in order to perform a special production effect. For instance it is sometimes desired to darken the dark background to increase the brightness of a subject in a scene. The known tone correcting circuit can not perform such a special production effect.

SUMMARY OF THE INVENTION

The present invention has for its object to provide a novel and useful circuit for correcting the tone of the image signal, in which the tone of the brightness signal can be corrected without influencing the brightness signal in the bright area, so that the whole image does not become white and further excellent tone correction ca be carried out without manually turning off the tone correction by monitoring the displayed image.

It is another object of the invention to provide a tone correcting circuit in which the tone of the brightness signal in the dark area is decreased or increased at will, and the tone in the bright area is relatively increased or decreased.

According to the invention, a circuit for correcting the tone of a brightness signal comprises a means for clipping off upper and lower portions of the brightness signal to produce a middle level brightness signal;

a means for processing in a non-linear manner the middle level brightness signal to derive a non-linearly processed brightness signal;

a means for deriving a difference between the non-linearly processed brightness signal and the middle level brightness signal to generate a tone correction signal; and a means for adding the tone correction signal to the brightness signal.

In the tone correcting circuit according to the invention, the tone correction is not effected for the whole brightness signal, but the tone correction signal is formed from the middle level brightness signal between upper and lower threshold levels, so that the tone correction can be performed without influencing the tone of the brightness signal in the bright area. Therefore, the deterioration of the displayed image due to the tone correction can be effectively avoided.

In a preferable embodiment of the tone correcting circuit according to the invention, said means for clipping off the lower portion of the brightness signal comprises a circuit for detecting a peak of the black level of the brightness signal and a lower clipper for clipping off the lower portion of the brightness signal lower than a lower threshold level which is automatically adjusted in accordance with the detected peak of the black level. In such a tone correcting circuit, the lower threshold level is automatically adjusted in accordance with the black level, and thus it is possible to prevent the whole image from becoming white even when the scene does not include a dark area such as a foggy scene.

According to another aspect of the invention, a circuit for correcting the tone of a brightness signal comprises a means for processing in a non-linear manner the brightness signal to derive a non-linearly processed brightness signal;

a means for deriving a difference between the non-linearly processed brightness signal and the brightness signal to generate a tone correction signal;

a means for controlling the polarity of the tone correction signal; and a means for adding the tone correction signal to the brightness signal.

By means of such a tone correcting circuit according to the invention, the tone of the brightness signal in the dark area can be exclusively decreased, so that the tone in the bright area can be enhanced relative to the dark area. Therefore, the background of the displayed image can be darkened and the special effect can be attained.

BRIEF DESCRIPTION OF THE DRAWINGS

FIG. 1 is a block diagram showing the construction of an embodiment of the tone correcting circuit according to the invention;

FIG. 2 is a signal waveform depicting the operation of the upper and lower limiters;

FIG. 3 is a signal waveform illustrating the operation of the non-linear circuit;

FIG. 4 is a signal waveform of the tone correction signal;

FIGS. 5A to 5D are signal waveforms showing the tone correcting operation according to the invention and the known tone correcting method.

DETAILED EXPLANATION OF THE PREFERRED EMBODIMENTS

Figure 6A:
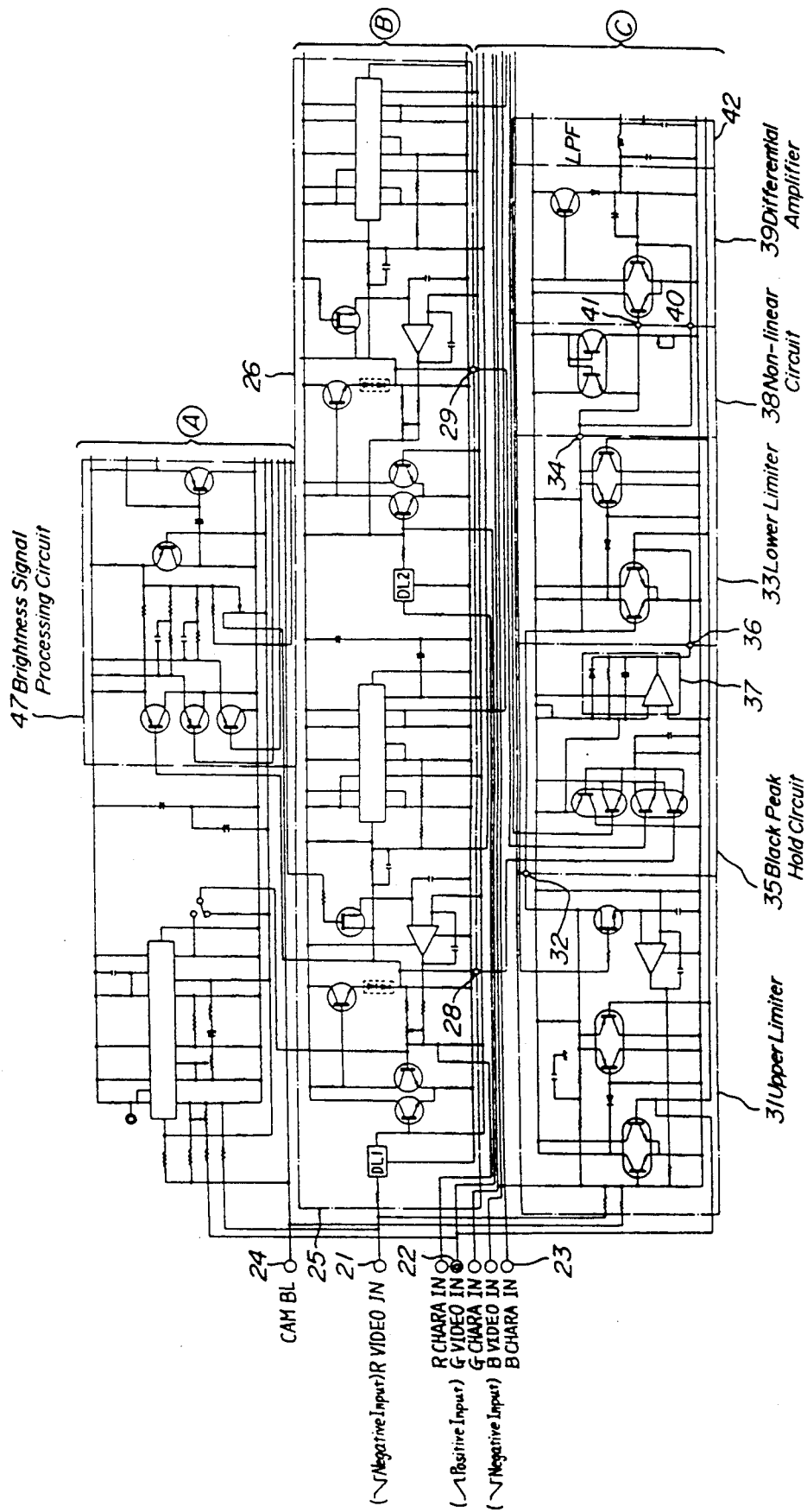
FIGS. 6A and 6B are circuit diagrams illustrating the detailed construction of the tone correcting circuit according to the invention.

FIG. 1 is a block diagram showing an embodiment of the tone correcting circuit according to the invention. A brightness signal Y generated from a television camera not shown is received at an input terminal 1 and is amplified by an amplifier 2 to a suitable level. Then the amplified brightness signal is supplied to an upper limiter 3 to remove an upper portion of the brightness signal higher than an upper threshold level. Then the brightness signal whose upper portion is clipped off by the upper limiter 3 is supplied to a lower limiter 4 to cut off a lower portion of the brightness signal lower than a lower threshold level. In this manner the brightness signal whose upper and lower portions have been removed can be obtained. In this specification, this brightness signal whose upper and lower level portions have been clipped off is sometimes called a middle level brightness signal.

FIG. 2 is a signal waveform illustrating the operation of the upper and lower limiters 3 and 4 for clipping off the upper portion of the brightness signal higher than the upper threshold level U and the lower portion lower than the lower threshold level L. As will be explained later, in the present embodiment the lower threshold level is automatically changed in accordance with the content of a scene picked-up by the television camera. According to the invention these upper and lower threshold levels U and L can be determined at will. In general, these threshold levels may be determined experimentally. The brightness signal shown in FIG. 2 is obtained by picking-up for one field period a test pattern whose brightness is continuously or linearly changed between a left hand black stripe and a right hand white stripe.

In the embodiment shown in FIG. 1, the brightness signal derived from the amplifier 2 is further supplied to a black level peak hold circuit 5 for holding a peak value of the black level of the brightness signal. In the peak hold circuit 5, the black level contained in the brightness signal is detected with the aid of the camera blanking signal. Then the lower threshold level L in the lower limiter 4 is controlled in accordance with the detected peak value of the black level. That is to say, the lower threshold level L is automatically set to a level which is equal to about 150% of the detected black level. A time constant of the peak hold circuit 5 is suitably set such that the lower threshold level L is not changed too fast. I has been experimentally confirmed that satisfactory control can be performed when the time constant of the peak hold circuit 5 is set to about 50 H(H is a horizontal scanning period). In the present embodiment, the lower threshold level L is automatically changed in accordance with the black level of the brightness signal, and therefore it is possible to perform automatically the optimum tone correction in accordance with the level of the brightness signal.

As explained above, the middle level brightness signal between the upper and lower threshold levels U and L is derived, and is then supplied to a non-linear circuit 6. In the non-linear circuit 6 the amplitude of the middle level brightness signal is selectively amplified as illustrated in FIG. 3. In FIG. 3 the broken line represents the middle level brightness signal supplied to the non-linear circuit 6. The thus non-linearly processed middle level brightness signal is supplied to a non-inverted input of a subtracting circuit 7. To a inverted input of the subtracting circuit 7 is supplied the middle level brightness signal produced by the lower limiter 4. Then the subtracting circuit 7 produces a tone correction signal C shown in FIG. 4.

As depicted in FIG. 1, the tone correction signal C produced by the subtracting circuit 7 is supplied via a gain control circuit 8 to a mixing circuit 9. To the mixing circuit 9 is also supplied the input brightness signal Y from the input terminal 1 and the tone correction signal C is added to the brightness signal Y. Then, the mixing circuit 9 produces an output brightness signal Yc whose tone has been corrected. To the gain control circuit 8 is connected a gain control resistor 10 for controlling the gain, i.e. amplitude of the tone correction signal C. The gain control circuit 8 further comprises a control terminal 11 to which is connected a manual control switch 12. By manually operating the manual switch 12 it is possible to select the polarity of the tone correction signal C and to disable the tone correction. That is to say, when a slide bottom 12a of the manual switch 12 is set into a positive side +, the tone correction signal having the positive polarity is supplied to the mixing circuit 9 so that the tone correction signal is added to the input brightness signal Y, but when the slide bottom 12a is moved into the negative side , the tone correction signal having the negative polarity is supplied to the mixing circuit 9 and the tone correction signal is subtracted from the input brightness signal. Further, when the slide bottom 12a is set into a neutral position OFF, the tone correction signal becomes zero, and the input brightness signal is supplied to the mixing circuit 9 as it is.

FIG. 5A shows input brightness signals supplied to the input terminal 1, and FIGS. 5B and 5C illustrate the output brightness signals for which the tone correction has been effected in the positive and negative polarities, respectively. FIG. 5D depicts the output brightness signals for which the known or conventional tone correction has been applied. In these figures the solid lines, chain lines and broken lines show cases in which the black level is low, high and middle, respectively. As illustrated in FIG. 5B, according to the present invention, since the tone correction signal is derived by extracting the middle level signal portion between the upper and lower threshold levels, the gain of the brightness signal in the low level portion can be exclusively made high without affecting the tone of the high level portion in the scene. Further in the above mentioned embodiment, since the lower threshold level is automatically changed in accordance with the peak value of the black level of the input brightness signal, it is possible to prevent effectively the displayed image from becoming white. Contrary to this, in the known tone correction method, as shown in FIG. 5D, the gain of the brightness signal in the bright area is also enhanced so that the entire displayed image becomes white. Moreover, according to the invention the tone correction signal can be added to the brightness signal in the negative polarity, so that the brightness in a dark area such as the background can be selectively made darker without changing the brightness of the bright area. Such a production effect could never be attained by the known tone correction method and could be first realized by the present invention. Therefore, according to the invention the production effect for the image signal picked-up by the video camera can be widened and varied in various manners.

Figure 6B:
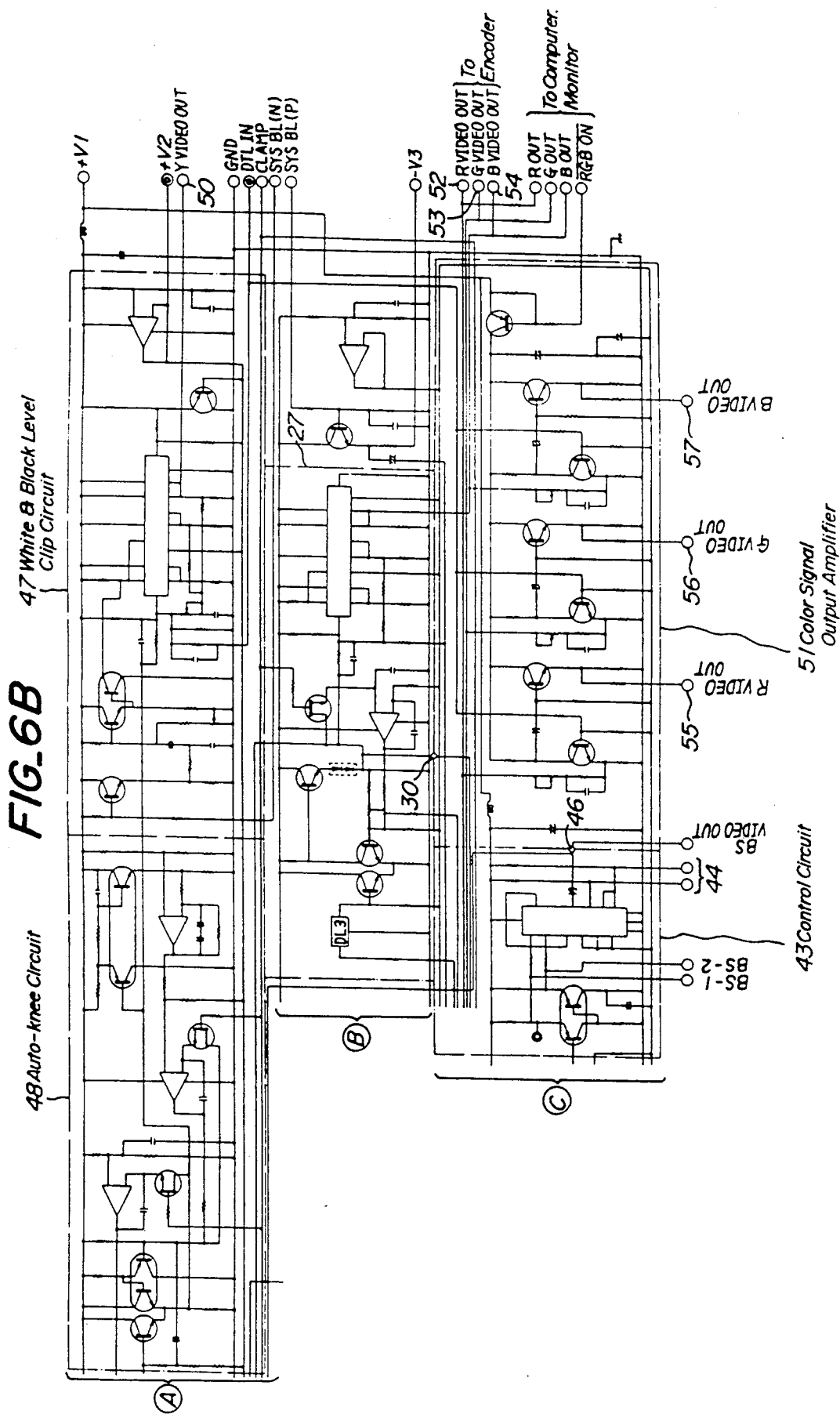

FIGS. 6A and 6B show the detailed construction of an embodiment of the tone correcting circuit according to the invention. To input terminals 21, 22 and 23 are supplied red, green and blue color signals generated by the color video camera. To an input terminal 24 is supplied a camera blanking pulse from the color video camera. The red, green and blue color signals are supplied to respective color signal processing circuits 25, 26 and 27, respectively. These color signal processing circuits 25, 26 and 27 include delay lines DL1, DL2 and DL3, respectively so that time deviations of these color signals due to various signal processings can be compensated for. The color signals received at the input terminals are combined at a given ratio to produce a brightness signal at an amplifier and upper limiter 31. The amplifier and upper limiter 31 produces at an output terminal 32 a brightness signal whose upper level portion higher than the upper threshold level has been clipped off. This brightness signal is then supplied to a lower limiter 33 which produces at an output terminal 34 a brightness signal whose lower level portion has been removed. In the lower limiter 33 the lower threshold level is fixedly determined and the level of the brightness signal is changed in accordance with the black level of the brightness signal detected by black level peak hold circuit 35. That is to say, to the black level peak hold circuit 35 are supplied the red, green and blue color signals from the color signal processing circuits 25, 26 and 27, respectively and the brightness signal is formed. Then the black level of the brightness signal is detected to produce the black peak level at an output terminal 36. To this end the black level peak hold circuit 35 comprises an integrating circuit 37 having an integration time constant of 50 H to 1 V (field scanning period). In this manner at the output terminal 34 of the lower limiter 33 there is produced a brightness signal whose upper and lower level portions have been clipped off. Then the thus obtained middle level brightness signal is supplied to a non-linear circuit 38 and an output signal of the non-linear circuit is supplied to one input terminal 40 of a differential amplifier 39. To the other input terminal 41 of the differential amplifier 39 is supplied the output signal of the lower limiter 33. Then the differential amplifier 39 produces at its output terminal a difference between these signals as the tone correction signal. The thus produced tone correction signal is supplied to a control circuit 43 via a low pass filter 42. To a control terminal of the control circuit 43 is supplied a control signal which controls the ON and OFF and the polarity of the tone correction signal. To the control circuit 43 it is also possible to supply a gain control signal for adjusting the gain of the tone correction signal. The tone correction signal is supplied to a brightness signal processing circuit 47 and is added to the brightness signal which is produced in this brightness signal processing circuit. That is to say, to the brightness signal processing circuit 47 are supplied the red, green and blue color signals from the color signal processing circuits 25, 26 and 27 and the brightness signal is formed by combining these color signals at a given ratio. Then the tone correction signal is added to the thus formed brightness signal. The brightness signal whose tone has been corrected in the manner mentioned above is then supplied to an auto-knee circuit 48, white level clipping circuit and black level clipping circuit 49 in this order. Then the brightness signal is supplied to an output terminal 50. The red, green and blue color signals produced by the color signal processing circuits 25, 26 and 27 are supplied to red, green and blue color signal output terminals 52, 53 and 54, respectively. Red, green and blue color signals produced by a color signal output amplifier 51 are supplied to color signal output terminals 55, 56 and 57. These color signals can be further supplied to a chromakey circuit to effect the image composition.

The present invention is not limited to the embodiments explained above, but may be modified in various ways within the scope of the invention. For instance, in the above embodiments the tone correction signal is derived by extracting the middle signal level portion, but according to the invention the tone correction signal may be derived by processing the whole brightness signal with the aid of the non-linear circuit and then the thus derived tone correction signal may be added to the brightness signal in the negative polarity.

In the tone correcting circuit according to the invention, the tone of the dark area can be effectively corrected without affecting the tone of the bright area. Further when the tone correction signal is formed by extracting the middle level portion of the brightness signal, the optimum tone correction can be performed automatically in accordance with the contents of the picked-up scene. This is especially effective for the portable type television camera in which a television monitor for displaying the picked-up image may not be easily available. Moreover since the gamma value of the television monitor is not necessarily changed, the color reproduction of the image signal produced by the television camera and the tone of the bright area are not changed, and therefore the displayed image is not so different from those which the operators are used to seeing. Moreover, the level of the dark area such as the background can be changed without changing the level of the bright area, and thus the special production effect can be attained.

What is claimed is:

1. A circuit for correcting a tone of a brightness signal comprising
    a means for clipping off upper and lower portions of the brightness signal to produce a middle level brightness signal;
    a means for processing in a non-linear manner the middle level brightness signal to derive a non-linearly processed brightness signal;
    a means for deriving a difference between the non-linearly processed brightness signal and the middle level brightness signal to generate a tone correction signal; and
    a means for adding the tone correction signal to the brightness signal.

2. A circuit according to claim 1, wherein said means for clipping off the lower portion of the brightness signal comprises
    a circuit for detecting a peak of the black level of the brightness signal; and
    a lower clipper limiter, said lower limiter clipping off the portion of the brightness signal which is than a lower threshold level, the valve of said lower threshold level being automatically adjusted in accordance with the detected peak of the black level.

3. A circuit according to claim 1, further comprising a control means for controlling the gain of the tone correction signal.

4. A circuit according to claim 3, wherein said control means further controls the polarity of the tone correction signal.

5. A circuit according to claim 4, wherein said control means comprises a manual control switch having a movable member which can be moved into a positive polarity position, a negative polarity position and an OFF position.

6. A circuit according to claim 5, wherein said OFF position is provided between the positive and negative polarity positions.

7. A circuit for correcting a tone of a brightness signal comprising
    a means for processing in a non-linear manner the brightness signal to derive a non-linearly processed brightness signal;
    a means for deriving a difference between the non-linearly processed brightness signal and the brightness signal to generate a tone correction signal;
    a control means for controlling the polarity of said tone correction signal; and
    a means for adding, to said brightness signal, the tone correction signal whose polarity has been controlled by said control means.

8. A circuit according to claim 7, wherein said control means comprises a manual control switch having a movable member which can be moved into a positive polarity position, a negative polarity position and an OFF position.

9. A circuit according to claim 8, wherein said OFF position is provided between the positive and negative polarity positions.

10. A circuit according to claim 8, wherein said control means comprises a means for manually adjusting the gain of the tone correction signal.

* * * * *